Patented Oct. 25, 1949

2,485,896

UNITED STATES PATENT OFFICE 2,485,896

METHOD FOR SHAPING ARTICLES OF METHYL METHACRYLATE RESIN

Howard J. Lucas and Franklin R. Hepner, Pasadena, Calif., assignors to the United States of America as represented by the Secretary of the Navy No Drawing. Application October 11, 1946, Serial No. 702,593

2 Claims. (Cl. 18—55)

This invention relates to methods for shaping articles of methyl methacrylate resin.

Objects of the invention are to provide improved methods for softening methyl methacrylate resins, whereby the resins may be deformed, shaped, or otherwise worked as desired; to provide improved methods for softening methyl methacrylate resins after the application of which the resins are easily rigidified while retaining their deformed character; and to provide for carrying out the foregoing objects in a facile, economical and efficient manner.

In accomplishing these and other objects of the present invention, we have provided improved methods and processes, preferred examples of which are hereinafter fully disclosed.

We have found that exposure of methyl methacrylate resin to gaseous hydrogen fluoride (HF) renders the resin soft and flexible, whereby the resin may be deformed, shaped or otherwise worked. The softening process is relatively independent of the surrounding temperature and hence may conveniently be carried out at room temperatures. As little as thirty seconds exposure to hydrogen fluoride renders methacrylate noticeably soft, but it is preferred to expose the materials for approximately thirty minutes. Exposure may take place in any suitable known apparatus for treating a solid material with a gaseous reagent.

After the softened resin has been deformed or shaped to form the desired article, it may be rigidified by exposure to air for several hours. The resin retains its deformed shape after it is rigidified.

While we have disclosed but certain processes for carrying out the present invention, it is obvious that these processes may be varied without departing from the spirit of the invention. Therefore, we do not wish to be limited by the disclosure set forth, but only by the scope of the appended claims.

What is claimed is:

1. The method of working methyl methacrylate resins comprising the steps of softening the resin by treating said resin with an atmosphere of gaseous hydrogen fluoride for at least 30 seconds, deforming the resin to a desired shape, and rigidifying the deformed resin by treating with air.

2. The method of softening hard acrylic plastics which comprises treating them to an atmosphere of gaseous hydrogen fluoride until a desired degree of softness is reached.

HOWARD J. LUCAS.
FRANKLIN R. HEPNER.

REFERENCES CITED

The following references are of record in the file of this patent:

UNITED STATES PATENTS

| Number | Name | Date |
|---|---|---|
| 2,297,248 | Randolph | Sept. 29, 1942 |
| 2,390,567 | Williams | Dec. 11, 1945 |

OTHER REFERENCES

Lucite Manual, Dupont Plastics Dept., November 1942, page 115. (Copy in Div. 50.)